Jan. 18, 1938.   C. H. ARMSTRONG   2,105,681
VALVE
Filed Sept. 10, 1935
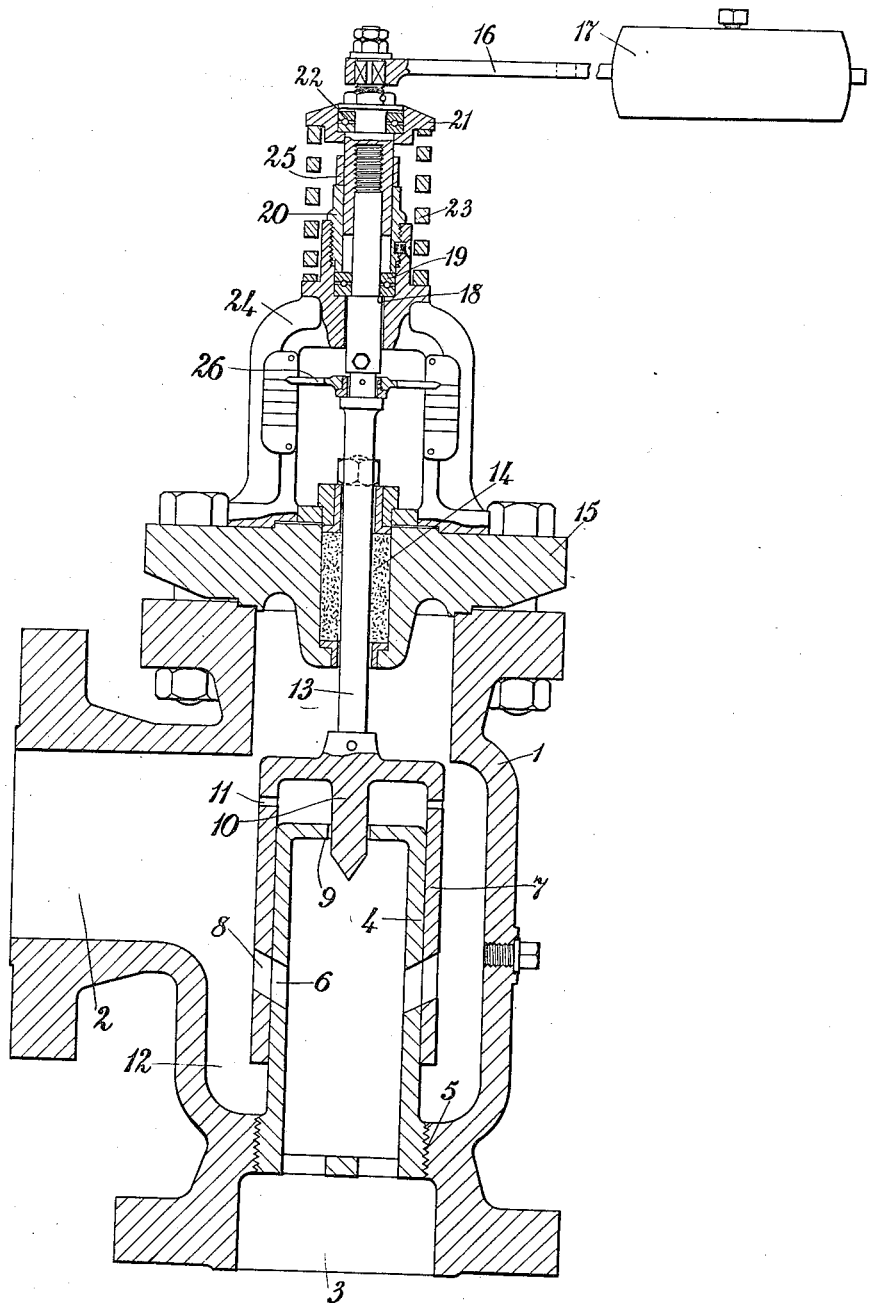
C. H. Armstrong
Inventor
By: Glascock Downing & Seebold
Attys.

Patented Jan. 18, 1938

2,105,681

UNITED STATES PATENT OFFICE 2,105,681

VALVE

Clifford Harry Armstrong, London, England, assignor to Copes Regulators Limited, London, England Application September 10, 1935, Serial No. 39,978
In France September 26, 1934

5 Claims. (Cl. 50—20)

This invention relates to valves for the control of fluids and is particularly concerned with valves adapted to be operated automatically in accordance with changes in the pressure or other characteristics of the fluid passing through the valve.

In controlling the flow of fluids under high pressures, as for example in the supply of feed water to high pressure steam generators, the large forces to which the valve members are subjected, and the varying influence of these forces under different conditions of flow very seriously interfere with the accuracy of control and render satisfactory automatic adjustment of the valve a matter of great difficulty. It is accordingly an object of the invention to overcome these difficulties and to provide a valve which is both sensitive and accurate, and at the same time is easy to operate while being adapted for use with high pressures.

According to the invention the rotatable valve member is arranged so that the difference in the pressures on the two sides of the valve is caused to act upon an area of the rotatable member very much less than the cross sectional area thereof so that even with very high pressures the total force on the member is not excessive. This may be conveniently achieved by arranging the rotatable member on the inlet side of the fixed member and preferably in the form of a sleeve surrounding the fixed member and closed at one end.

A clearance space permitting the required longitudinal movement of the rotatable member is left between the closed end thereof, and the end of the fixed member, and one or more orifices are provided to afford access for the inlet fluid pressure to this space. The rotatable sleeve member is provided with a guide pin which enters a guide opening in the otherwise closed end of the fixed member, and the pressure difference acting upon the area of such pin determines the longitudinal displacement of the rotatable valve member.

Preferably the ports are spaced equally around the circumference of the rotatable valve member or sleeve, and are located in an annular chamber formed by the valve body, and removed laterally from the axis of the inlet connection.

The arrangement provides, according to another feature of the invention, that the force acting on the rotatable valve member by reason of the pressure drop through the valve is transmitted to a spring or other resilient means through bearings, and the increased frictional resistance to rotation of the valve with increased inlet pressure eliminates the tendency to disturb the rotational setting of the valve due to this cause.

One mode of carrying the invention into effect is illustrated in the accompanying drawing which represents a longitudinal section through a water valve suitable for controlling the supply of feed water to a boiler.

In the drawing the valve casing 1 is provided with an inlet connection 2 and an outlet connection 3 arranged at right angles to the inlet. The valve opening is controlled by a pair of members which may be formed as ported sleeves. A fixed sleeve member 4 is mounted in the casing as by a threaded connection 5 with the axis of the sleeve aligned with the outlet 3, and is provided with two or more ports 6 spaced circumferentially and uniformly. The fixed member 4 forms a guide for a movable sleeve member 7 which has a close sliding fit over the outside of the fixed member and is provided with ports 8 corresponding to the ports 6 in the fixed member. The upper end of the fixed sleeve is closed except for an opening 9 which is adapted to receive a guide pin 10 attached to or integral with the movable member 7.

The upper part of the member 7 is closed except for one or more small orifices 11, the purpose of which will be described hereinafter.

The ports 6 and 8 in the fixed and movable valve members are inclined as shown towards the outlet and are arranged so that they lie within an annular chamber or space 12 formed between the casing 1 and the fixed member or sleeve 4.

It will be seen that the fluid entering at the inlet 2 has access to the whole of the outside and to the head of the member 7 and also to the interior of the upper part thereof through the orifices 11.

Secured to the valve member 7 is an operating spindle 13 which passes through a gland packing 14 secured in a removable flange 15, and is attached at its upper end to a lever 16 which may be operated in any convenient manner, for example from a device responsive to the water level in a boiler. The details of the mechanism which may be employed for actuating the valve by rotation of its spindle forms no part of the present invention and will not be further described. A counterweight 17 may be added if desired.

The spindle 13 is movable axially between two limiting positions. Its uppermost position as shown in the drawing is determined and fixed by a shoulder or collar 18 on the spindle engaging with a bearing 19 which is held in position in a seating in the casing extension 24 by a removable sleeve 20. A collar 21 is seated against a bearing 22 secured at the upper end of the spindle, and a spring 23 is interposed between this collar and the extension 24 of the valve casing, thus permitting downward movement of the spindle and valve member against the compressive resistance of the spring 23. This downward movement is limited to the clearance which exists between the collar 22 when the spindle is in its uppermost position as shown, and a ring 25 resting on the top of the removable sleeve 20. By using rings of different lengths the clearance may be varied as desired. A pointer 26 rotatably mounted on the spindle serves to indicate the vertical position of the valve.

By the arrangement of the valve with the outlet at right angles to the inlet and by placing the rotatable valve member so that its axis is parallel with the outflow, the wear on the moving parts is greatly reduced and stable operating conditions are ensured, and there is also a free and unobstructed axial flow of the fluid after it has passed through the controlling ports.

Moreover, the circumferential arrangement of the valve ports ensures as far as possible a balanced flow and the location of the ports in an annular chamber or space lying away from the axis of the inlet connection reduces the effects of eddying in the fluid in the neighborhood of the ports.

It will be appreciated that when fluid is passing through the valve, the member 7 is exposed to the inlet pressure acting upon the outside thereof and in the upper clearance space owing to the presence of the orifices 11, and to the outlet pressure acting upon the cross-sectional area of the pin 10. Thus the total axial force to which the valve is subjected is substantially determined by the pressure drop through the valve and the relatively small cross-sectional area of the pin 10, and consequently even with exceedingly high fluid pressures the force on the valve itself will not be excessive.

The axial force exerted on the valve due to the pressure drop is opposed by the spring 23 and the valve member 7 will therefore assume a position determined by the difference between the inlet and outlet pressures. Thus, for example, if the inlet pressure rises, the valve will move towards the outlet end thereof and the port openings will be partially closed, thus tending to maintain the flow through the valve constant for a given rotational setting. Owing to the actual force on the valve being relatively small as previously explained, the arrangement is very sensitive to pressure changes, and close control can be exercised over the rate of flow of the fluid.

When very high fluid pressures are being dealt with the passage of fluid past the ports tends to rotate the movable valve member and this tendency will vary according to the pressure. With the present arrangement, an increase of the inlet pressure will entail an increased downward force on the thrust bearings of the valve spindle, and the consequent increased frictional resistance will oppose the tendency to rotation so that variations in the valve setting due to this cause will be substantially eliminated.

It is to be understood that although a form of valve has been described with reference to boiler feed control the invention is capable of many other applications, and the particular example described is capable of various modifications in the size, form and arrangement of its parts without departing from the spirit of the invention.

Having now described my invention what I claim as new and desire to secure by Letters Patent is:—

1. A regulating valve for controlling the flow of fluid in accordance with the pressure thereof, comprising a casing, a cylindrical ported seat fixed within the casing, a valve member comprising a ported sleeve closed at one end and arranged for both rotative and axial movement upon said seat to vary the port opening, said seat having an opening at one end and said sleeve having a guide pin entering and closely fitting said opening, means for opposing axial movement of the valve member means affording constant access for fluid from the inlet side of the valve to opposed areas of the closed end of the sleeve to provide a substantial degree of axial balance, fluid from the other side of the valve only having access to the exposed and relatively small area of the guide pin whereby the valve member is normally maintained in a regulating position dependent upon the pressure drop through the valve, and means for rotating the valve from outside the casing to vary the port opening independently of the axial position of the valve.

2. A regulating valve for controlling the flow of fluids under relatively high pressures, comprising a casing, a cylindrical ported seat therein, a ported valve sleeve closed at one end movable both rotationally and axially upon said seat, a guide pin extending within the sleeve from the closed end thereof and closely fitting a circular aperture in the end of the seat, a rotatable spindle secured to said sleeve and extending outside the casing, said spindle being of smaller diameter than said guide pin and means for constantly admitting fluid from one side of the valve to opposed areas of the sleeve, whereby the valve member is maintained in a regulating position by the difference of the pressures on the two sides of the valve acting upon an area represented by the difference between the areas of the said spindle and guide pin respectively.

3. A regulating valve according to claim 2 in which resilient means such as a spring is provided for counterbalancing the axial force on the valve member due to the fluid pressures acting thereon.

4. A regulating valve for controlling the flow of fluids under relatively high pressures, comprising a tubular ported valve member arranged upon the outside of a cylindrical ported seat within a casing, said tubular valve member being closed at one end and having on one side of such end a pin extending into and closely fitting an aperture in the otherwise closed end of the fixed seat and on the other side a rotatable spindle extending outside the casing, the cross-sectional area of the spindle being less than that of the pin and means being provided for constantly admitting fluid from the inlet side of the valve to both sides of the closed end of the tubular valve member whereby the axial force thereon will be determined by the pressure drop through the valve acting upon an area represented by the difference in the cross-sectional areas of the said spindle and pin respectively, means being provided for rotating the spindle to vary the port opening independently of the axial position of the valve member, and means for opposing axial movement of the said member.

5. A regulating valve for controlling the flow of fluids at high pressures, comprising a casing, a cylindrical ported seat fixed within said casing, a tubular ported valve member rotatable and slidable axially upon the outside of said seat, means affording continuous access for fluid from one side of the valve to opposed differential areas of said valve member to provide a substantial degree of axial balance, means affording continuous access from the other side of the valve to an area on one side only of the valve member, a spindle secured to the said member and extending outside the casing, means for rotating the spindle, resilient means opposing axial movement of the valve member under the fluid pressures acting thereon and anti-friction means disposed between the spindle and said resilient means.

CLIFFORD HARRY ARMSTRONG.